United States Patent
Song et al.

(10) Patent No.: US 9,053,742 B1
(45) Date of Patent: Jun. 9, 2015

(54) REPEATED RUNOUT (RRO) ZERO PHASE START (ZPS)

(71) Applicant: Marvell International Ltd., Hamilton (BM)

(72) Inventors: Hongxin Song, Sunnyvale, CA (US); Michael Madden, Mountain View, CA (US); Gregory Burd, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 13/870,715

(22) Filed: Apr. 25, 2013

Related U.S. Application Data

(60) Provisional application No. 61/640,977, filed on May 1, 2012.

(51) Int. Cl.
*G11B 5/09* (2006.01)
*G11B 20/10* (2006.01)

(52) U.S. Cl.
CPC ............................ *G11B 20/10222* (2013.01)

(58) Field of Classification Search
CPC .................. G11B 20/1022; G11B 20/10268; G11B 20/10398; G11B 20/1876
See application file for complete search history.

(56) References Cited

U.S. PATENT DOCUMENTS

| | | | | |
|---|---|---|---|---|
| 6,636,120 B2 * | 10/2003 | Bhakta et al. | .................. | 331/17 |
| 6,654,432 B1 * | 11/2003 | O'Shea et al. | ................ | 375/354 |
| 7,773,328 B1 * | 8/2010 | Katchmart et al. | ............. | 360/51 |
| 8,243,869 B2 * | 8/2012 | Dvir et al. | ..................... | 375/376 |
| 2002/0017950 A1 * | 2/2002 | Shimoda | ...................... | 329/364 |

* cited by examiner

*Primary Examiner* — Daniell L Negron

(57) ABSTRACT

Systems, methods, apparatus, and techniques are provided for producing an estimate of a digital sequence. A continuous-time signal is obtained. The continuous-time signal is sampled with an oversampling factor to produce a discrete-time signal corresponding to the continuous-time signal. A phase offset estimate of the continuous-time signal is produced based on the discrete-time signal. The discrete-time signal is interpolated based on the phase offset estimate to produce an interpolated discrete-time signal. The interpolated discrete-time signal is processed to produce an estimate of a digital sequence.

16 Claims, 5 Drawing Sheets

REPEATED RUNOUT (RRO) ZERO PHASE START (ZPS)

This disclosure claims the benefit of, and priority to, U.S. Provisional Application No. 61/640,977, filed May 1, 2012, the disclosure of which is hereby incorporated by reference herein in its entirety.

FIELD OF USE

This disclosure relates to phase offset estimation techniques for use in disk drive systems, and other types of data systems, to enable accurate sampling of a waveform at desired times.

BACKGROUND OF THE DISCLOSURE

In many data applications, a sinusoidal (or approximately sinusoidal) continuous-time waveform is read and sampled at regular intervals to produce a discrete-time sampled waveform that contains data of interest. For example, in hard disk drive servo applications, continuous-time repeated runout (RRO) data is sampled (at regular intervals) to read digital data stored on the hard disk. In general, it is important that the sampling of continuous-time waveforms be phase synchronized so that the peaks of the sinusoidal waveform are read. If sampling is not phase synchronized, samples of the discrete-time sampled waveform may be unreliable (e.g., be of a low signal-to-noise ratio (SNR)) which will degrade application performance. For example, in a hard disk drive servo application, a lack of phase synchronization may lead to incorrectly reading data from the hard disk.

SUMMARY OF THE DISCLOSURE

Systems, methods, apparatus, and techniques are provided for producing an estimate of a digital sequence. A continuous-time signal is obtained. The continuous-time signal is sampled with an oversampling factor to produce a discrete-time signal corresponding to the continuous-time signal. A phase offset estimate of the continuous-time signal is produced based on the discrete-time signal. The discrete-time signal is interpolated based on the phase offset estimate to produce an interpolated discrete-time signal. The interpolated discrete-time signal is processed to produce an estimate of a digital sequence. In some arrangements, an output of the discrete-time signal is delayed for a pre-specified length of time prior to interpolating the discrete-time signal based on the phase offset. In some arrangements, the pre-specified length of time is based on a length of time required to determine the phase offset estimate of the continuous-time signal based on the discrete-time signal.

Further systems, methods, apparatus, and techniques are provided for producing an estimate of a digital sequence. Read circuitry is configured to obtain a continuous-time signal. Analog-to-digital (A/D) conversion circuitry is configured to sample the continuous-time signal with an oversampling factor to produce a discrete-time signal corresponding to the continuous-time signal. Estimation circuitry is configured to determine a phase offset estimate of the continuous-time signal based on the discrete-time signal. Interpolation circuitry is configured to interpolate the discrete-time signal based on the phase offset estimate to produce an interpolated discrete-time signal. Detection circuitry is configured to process the interpolated discrete-time signal to produce an estimate of a digital sequence. In some arrangements, delay circuitry is configured to receive the discrete-time signal from the A/D conversion circuitry and provide the discrete-time signal to the interpolation circuitry after delaying the discrete-time signal for a pre-specified length of time. In some arrangements, the pre-specified length of time is based on a length of time required for the estimation circuitry to determine the phase offset estimate of the continuous-time signal based on the discrete-time signal.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Disclosed herein are techniques for determining a phase offset in a timing recovery process in a synchronous communications or storage system. The techniques described herein may be implemented by an analog-to-digital (A/D) converter to sample a sinusoidal analog signal near peaks of the signal when only a minimal amount of training or preamble data is available to perform clock phase adjustment.

Figure 1:
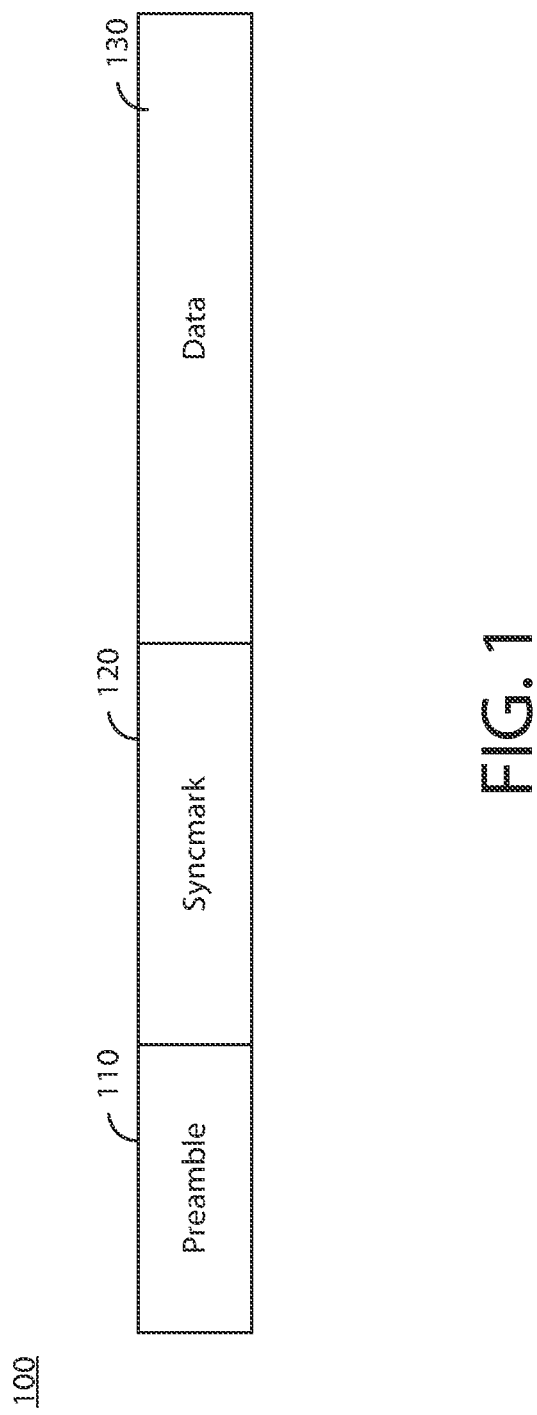
FIG. 1 depicts an illustrative RRO packet format in accordance with some implementations.

FIG. 1 depicts an illustrative RRO packet format in accordance with some implementations. Specifically, packet 100 includes preamble 110, syncmark 120, and data 130. The preamble 110 includes a fixed pattern of sinusoidal data at a given frequency that is used to perform timing recovery. That is, the preamble data may be read and processed by timing circuitry, which determines a sample phase offset.

The syncmark 120 contains a fixed data pattern that is common across all data sectors. Further, a syncmark such as the syncmark 120 precedes each data sector on a disk drive. Using this feature, syncmarks are used for synchronization when reading data from a disk drive. The user data 130 includes actual application data that is stored on the hard disk. In addition, the user data 130 may include subfields for checking data integrity, performing error detection or correction, and for providing padding bytes so that the user data 130 is of a fixed length.

Figure 2:
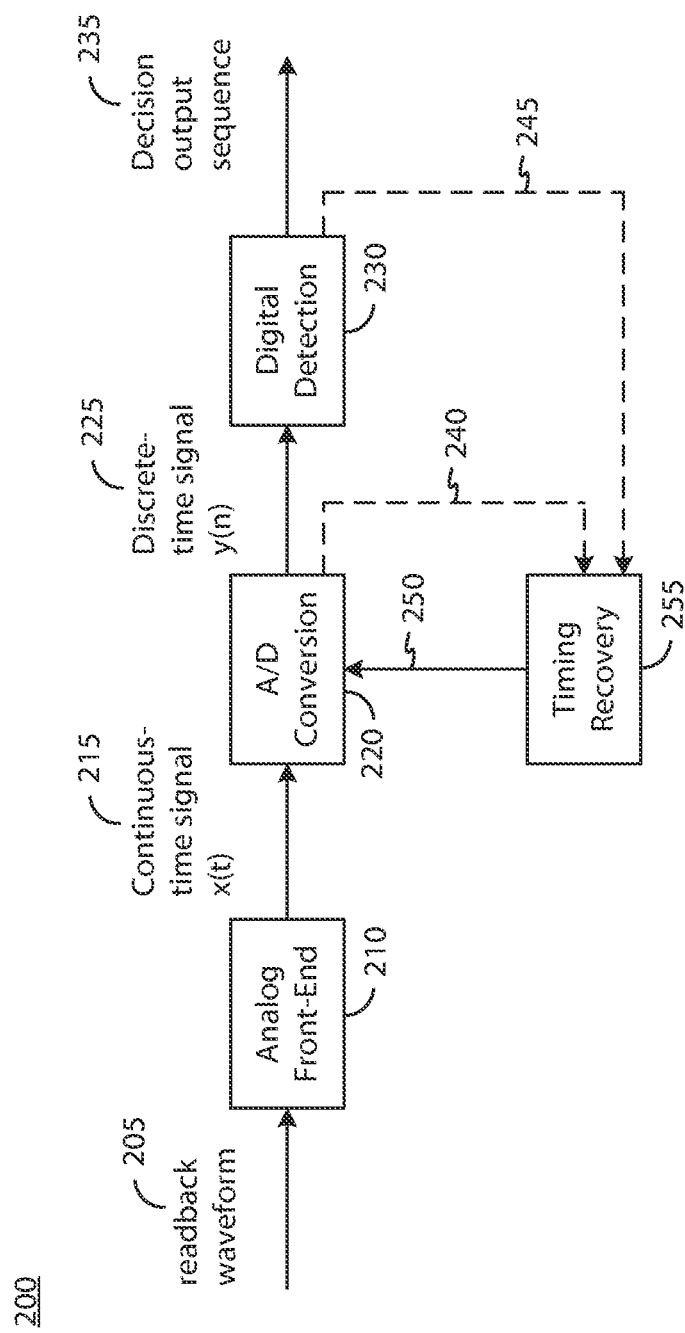
FIG. 2 depicts an illustrative read channel path for recovering digital data stored in an analog medium in accordance with some implementations.

FIG. 2 depicts an illustrative read channel path for recovering digital data stored in an analog medium in accordance with some implementations. In particular, read channel path 200 may represent a simplified version of circuitry implemented in a read channel of a hard disk drive system. Readback waveform 205 is an analog waveform read directly by a read-and-write head of a hard disk drive. The readback waveform 205 is provided to analog front-end module 210, which processes the readback waveform 205 to produce continuous-time signal x(t) 215. The main purpose of the analog front-end module 210 is to remove known noise artifacts from the readback waveform 205 so as to convert the readback waveform 205 into a form more suitable for subsequent processing in the read channel path 200. For example, in some implementations, the analog front-end module 210 identifies and removes a direct current (DC) component from the readback waveform 205. In some implementations, the analog front-end module 210 amplifies the readback waveform 205.

The continuous-time signal x(t) 215 is provided to the A/D conversion module 220. Specifically, the A/D conversion module 220 samples the continuous-time signal x(t) 215 once every symbol period, i.e., once every T seconds, to produce the corresponding discrete-time signal y(n) 225. Digital detection module 230 processes samples of the discrete-time signal y(n) 225 to produce a decision output sequence 235. The digital detection module may employ a Viterbi detector or any other suitable detector in order to produce the decision output sequence 235 from the discrete-time signal y(n) 225.

As described above, the A/D conversion module 220 samples the continuous-time signal x(t) 215 once every T seconds, where T is a symbol period. However, a sampling phase offset used by the A/D conversion module 220 is generally specified by an input 250 provided by timing recovery module 255. In general, the timing recovery module 255 may determine the sampling phase offset based on the discrete-time signal y(n) 225, provided to the timing recovery module 255 by input 240 and/or based on the decision output sequence 235, provided to the timing recovery module 255 by input 245.

In some implementations of the read channel path 200, the readback waveform 205 has structure denoted by the packet 100 of FIG. 1 and the timing recovery module 255 determines the sampling phase offset based on the discrete-time signal y(n) 225, provided to the timing recovery module 255 by input 240, during the period of the known preamble 110 only. Specifically, in these implementations, the preamble portion of the discrete-time signal y(n) 225 (or, equivalently, the continuous-time signal x(t) 215) is close to sinusoidal. Thus, the timing recovery module 255 estimates the phase of the sinusoidal sequence of the preamble portion of the discrete-time signal y(n) 225 and applies the estimated phase as a sampling phase offset via input 250.

However, one potential drawback of this approach is that the length of the preamble 100 may, in some implementations, be too short to allow an accurate determination of the sampling phase offset. Accordingly, additional techniques may be used to determine the sampling phase offset. For example, assuming that a length of a RRO is short compared to a frequency offset, a phase change in the waveform for the entire RRO may be assumed to be approximately constant. In this case, FIGS. 3 and 4 detail timing recovery systems based on interpolative methods that may be used to accurately estimate a phase offset based on a limited-length preamble 100.

Figure 3:
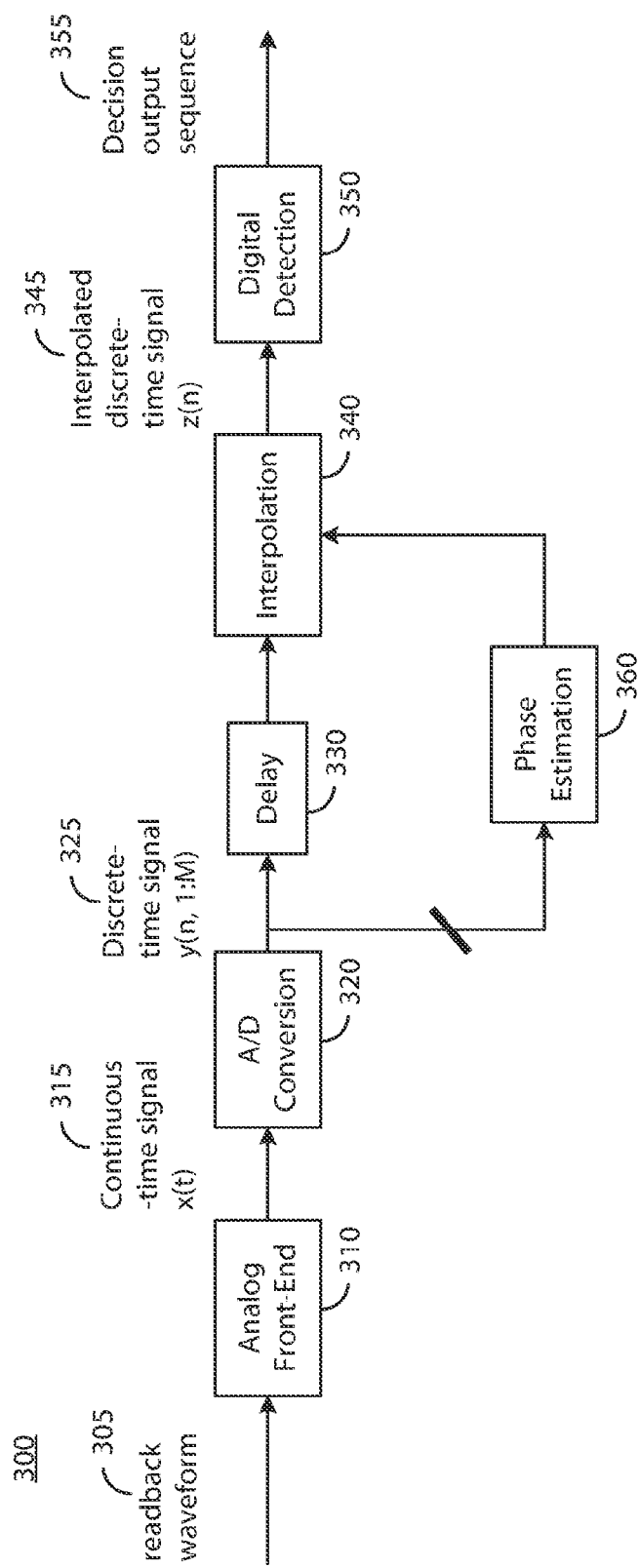
FIG. 3 depicts an illustrative timing recovery system based on interpolative methods that may be used to accurately estimate a phase offset based on a limited-length preamble in accordance with some implementations.

FIG. 3 depicts an illustrative timing recovery system based on interpolative methods that may be used to accurately estimate a phase offset based on a limited-length preamble in accordance with some implementations. In particular, in read channel path 300, a phase offset is calculated prior to performing interpolation.

Readback waveform 305 is an analog waveform read directly by a read-and-write head of a hard disk drive. The readback waveform 305 is provided to analog front-end module 310, which processes the readback waveform 305 to produce continuous-time signal x(t) 315. The analog front-end module 310 may operate similarly or identically to the analog front-end module 210 described in relation to FIG. 2. The continuous-time signal x(t) 315 is provided to the A/D conversion module 320 which oversamples the continuous-time signal x(t) 215 by a factor M to produce the discrete-time signal y(n,1:M) 325. Specifically, while the system of FIG. 3 has a symbol period of T seconds, the A/D conversion module 320 samples the continuous-time signal x(t) 315 once every T/M seconds, where M is an integer value larger than 1. Stated another way, rather than attempt to sample at the proper phase offset, the A/D conversion module 320 instead samples the continuous-time signal x(t) 215 at M different potential values for the phase offset. The discrete-time signal y(n,1:M) 325 is provided to both the delay module 330 and the phase estimation module 360.

The phase estimation module 360 processes the oversampled discrete-time signal y(n,1:M) 325 to produce an estimate of the phase offset present in that signal. For example, in some implementations, the phase estimation module 360 employs a Discrete Fourier Transform (DFT) to perform phase estimation. In this regard, the phase estimation module may use multiple substreams derived from the discrete-time signal y(n,1:M) 325, where a larger number of streams results in more accurate phase estimation at the expense of increased hardware complexity. For example, when M=4, the phase estimation module 360 may use all four available substreams of the discrete-time signal y(n,1:M) 325, namely streams y(n,1), y(n,2), y(n,3), and y(n,4).

On the other hand, as a computationally less intensive alternative, the phase estimation module 360 may use the streams y(n,1) and y(n,3), or the streams y(n,2) and y(n,4), of the discrete-time signal y(n,1:M) 425. The phase estimation module 360 provides its estimate of the phase in the form of interpolation coefficients to the interpolation module 340, the operation of which is described below.

The delay module 330 delays the discrete-time signal y(n,1:M) 325 for a long enough period of time for the phase estimate results of the phase estimation module 360 to be completed. In this way, the delay module 330 reduces a required preamble length needed to perform phase offset estimation. Interpolation module 340 receives the (delayed) oversampled discrete-time signal y(n,1:M) 325 and the interpolation coefficients from the interpolation module 340 and produces an interpolated discrete-time signal z(n) 345 that is at the baud rate (i.e., one symbol for each symbol period T). In particular, the interpolator uses the interpolation coefficients from the interpolation module 340 to produce an interpolated discrete-time signal z(n) 345 that represents values of the continuous-time signal x(t) 315 when sampled at its peaks. As would be understood by one of ordinary skill, based on the disclosure and teachings herein, in some implementations, the interpolation module 340 simply retains the one sample of the M samples of the discrete-time signal y(n,1:M) 325 per symbol period that best captures the "peak" in the continuous-time signal x(t) 315 occurring during this symbol period. In some implementations, the interpolation module 340 processes the interpolation coefficients using a 2 base point linear interpolation technique to produce the interpolated discrete-time signal z(n) 345. In some implementations, the interpolation module 340 processes the interpolation coefficients using a cubic spline interpolation technique to produce the interpolated discrete-time signal z(n) 345.

Digital detection module 350 processes samples of the interpolated discrete-time signal z(n) 345 to produce a decision output sequence 355. The digital detection module may employ a Viterbi detector or any other suitable detector in order to produce the decision output sequence 355 from the interpolated discrete-time signal z(n) 345.

Figure 4:
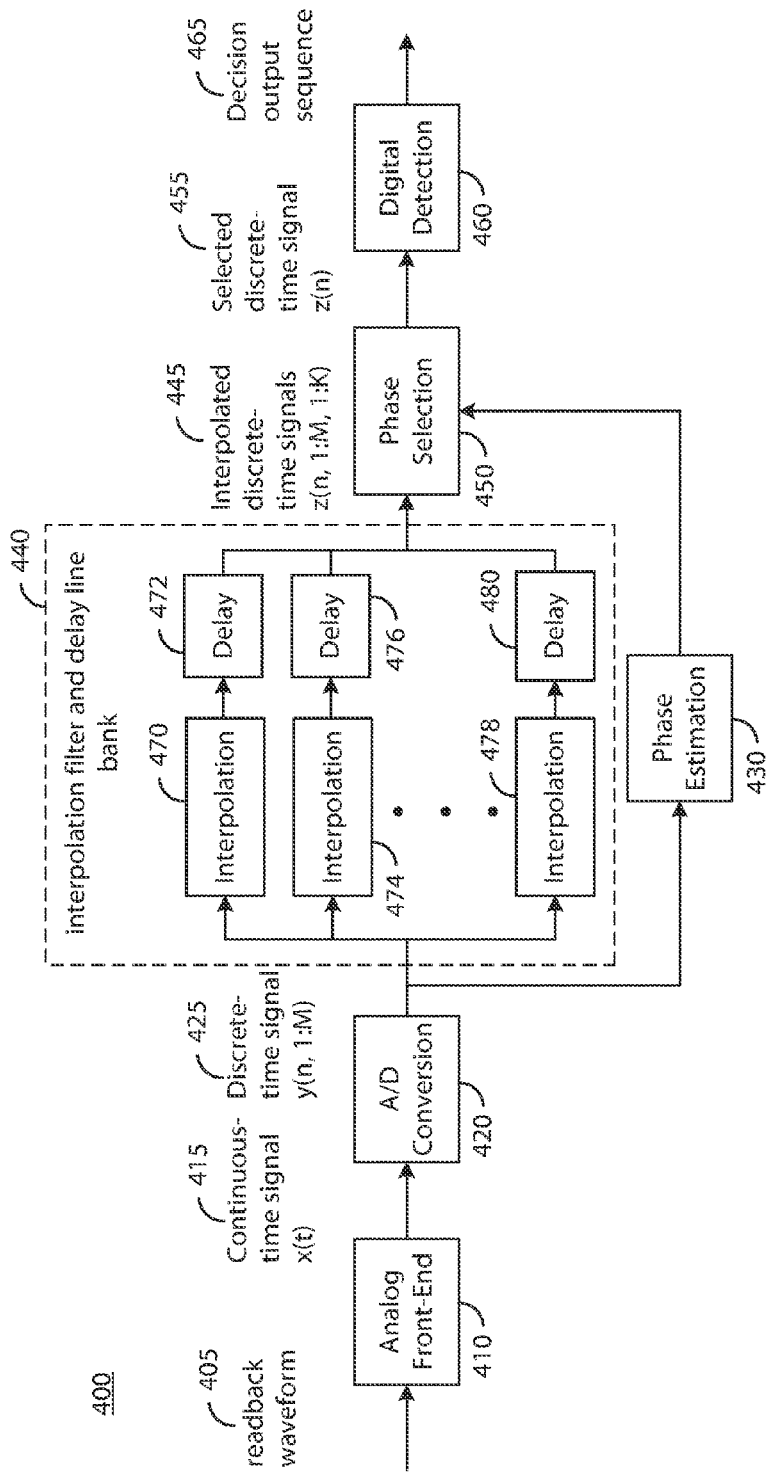
FIG. 4 depicts another illustrative timing recovery system based on interpolative methods that may be used to accurately estimate a phase offset based on a limited-length preamble in accordance with some implementations.

FIG. 4 depicts another illustrative timing recovery system based on interpolative methods that may be used to accurately estimate a phase offset based on a limited-length preamble in accordance with some implementations. In contrast to read channel path 300, in the read channel path 400, a phase offset is calculated after performing (M types of) interpolation. Readback waveform 405 is an analog waveform read directly by a read-and-write head of a hard disk drive. The readback waveform 405 is provided to analog front-end module 410, which processes the readback waveform 405 to produce continuous-time signal x(t) 415. The analog front-end module 410 may operate similarly or identically to the analog front-end module 210 described in relation to FIG. 2. The continuous-time signal x(t) 415 is provided to the A/D conversion module 420 which oversamples the continuous-time signal x(t) 415 by a factor M to produce the discrete-time signal y(n,1:M) 425.

Specifically, while the system of FIG. 4 has a symbol period of T seconds, the A/D conversion module 420 samples the continuous-time signal x(t) 415 once every T/M seconds, where M is an integer value larger than 1. Stated another way, rather than attempt to sample at the proper phase offset, the A/D conversion module 420 instead samples the continuous-time signal x(t) 415 at M different potential values for the phase offset. The discrete-time signal y(n,1:M) 425 is provided to both interpolation filter and delay line bank module 440 and phase estimation module 430.

The phase estimation module 430 processes the oversampled discrete-time signal y(n,1:M) 425 to produce an estimate of the phase offset present in that signal. For example, in some implementations, the phase estimation module 430 employs a DFT to perform phase estimation. In this regard, the phase estimation module may use multiple substreams derived from the discrete-time signal y(n,1:M) 425, where a larger number of streams results in more accurate phase estimation at the expense of increased hardware complexity. For example, when M=4, the phase estimation module 430 may use all four available substreams of the discrete-time signal y(n,1:M) 425, namely streams y(n,1), y(n,2), y(n,3), and y(n,4). As a computationally less intensive alternative, the phase estimation module 430 may use the streams y(n,1) and y(n,3) or the streams y(n,2) and y(n,4) of the discrete-time signal y(n,1:M) 425. The phase estimation module 430 provides its estimate of the phase in the form of an index value, having a value from 1 to M×K, which is used by phase selection module 450 in a manner described below.

The interpolation filter and delay line bank module 440 includes M×K interpolation banks. For example, interpolation filter and delay line bank module 440 includes the bank of interpolator 470 and delay module 472, the bank of interpolator 474 and delay module 476, and the bank of interpolator 478 and delay module 480. Specifically, K different interpolation streams are generated for each of the M data sequences, y(n,1), y(n,2), ..., y(n,M), resulting in a total of M×K output data streams. Within a given stream, consecutive samples are separated by a symbol period of T. Further, the samples corresponding to the $i^{th}$ data sequence and the $j^{th}$ interpolation sequence are given by $v_{ij}[n]=nT+(i/M)T+(j/(K \times M))T$. Thus, two neighboring streams within the interpolation filter and delay line bank module 440 are spaced T/(K×M) apart in time. As would be understood by one of ordinary skill, based on the disclosure and teachings herein, each of the interpolators of the interpolation filter and delay line bank module 440 may use any suitable interpolation technique to produce an output and the different interpolators may use different interpolation techniques.

The delay modules of the interpolation filter and delay line bank module 440 delay respective signal outputs for a long enough period of time for the phase estimate results of the phase estimation module 430 to be completed. In this way, the interpolation filter and delay line bank module 440 reduces a required preamble length needed to perform phase offset estimation. Phase selection module 450 receives the interpolated discrete-time signals z(n,1:M,1:K) 445 associated with each of the M×K interpolated output data streams from the interpolation filter and delay line bank module 440 and the index of the estimated phase from the phase estimation module 430.

The phase selection module 450 chooses the stream from among the M×K streams of the interpolated discrete-time signals z(n,1:M,1:K) 445 specified by the index, i.e., the stream that most closely approximates the phase determined by the phase estimation module 430. The phase selection module 450 outputs the chosen stream from the interpolated discrete-time signals z(n,1:M,1:K) 445 at the system baud rate (i.e., one symbol for each symbol period T) as the selected discrete-time signal z(n) 455. Since the streams of the interpolated discrete-time signals z(n,1:M,1:K) 445 are spread apart by a phase difference of T/(K×M), the maximum phase error produced by the selection at phase selection module 450 is T/(2K×M)).

Digital detection module 460 processes the selected discrete-time signal z(n) 455 to produce a decision output sequence 465. The digital detection module 460 may employ a Viterbi detector or any other suitable detector in order to produce the decision output sequence 465 from the selected discrete-time signal z(n) 455.

Three examples are presented to illustrate aspects of the operation of the read channel path 400. As a first example, consider the case where the A/D conversion module 420 samples at the system baud rate (M=1) and where interpolators of the interpolation filter and delay line bank module 440 interpolate with a factor of 2 (K=2). In this case, the interpolation filter and delay line bank module 440 outputs two data streams after interpolation, z(n,1,1) and z(n,1,2). Further, the maximum residual phase error produced by the output of the phase selection module 450 is T/(2(K×M))=T/4.

As a second example, consider the case where the A/D conversion module 420 samples at twice the system baud rate (M=2) and where interpolators of the interpolation filter and delay line bank module 440 again interpolate with a factor of 2 (K=2). In this case, the interpolation filter and delay line bank module 440 outputs four data streams after interpolation, z(n,1,1), z(n,1,2), z(n,2,1), and z(n,2,2). Further, the maximum residual phase error produced by the output of the phase selection module 450 is T/(2(K×M))=T/8.

As a third example, consider the case where the A/D conversion module 420 samples at the system baud rate (M=1) and where interpolators of the interpolation filter and delay line bank module 440 again interpolate with a factor of 4 (K=4). In this case, the interpolation filter and delay line bank module 440 outputs four data streams after interpolation, z(n,1,1), z(n,1,2), z(n,1,3), and z(n,1,4). Further, the maximum residual phase error produced by the output of the phase selection module 450 is T/(2(K×M))=T/8. Comparing the outputs of examples 2 and 3, above, it is seen that both system configurations result in the same amount of maximum potential phase error (T/8). However, the system of example 2 has the advantage that the A/D conversion module 420 runs at a slower rate and the disadvantage of requiring additional interpolation and delay circuitry in the interpolation filter and delay line bank module 440.

Figure 5:
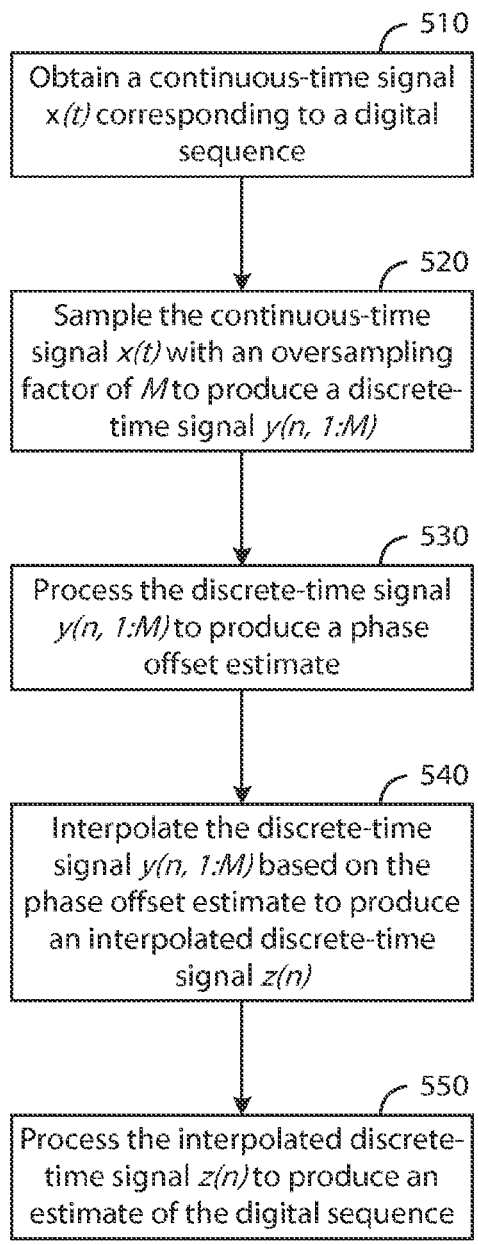
FIG. 5 depicts an illustrative process for producing an estimate of a digital sequence in accordance with some implementations.

FIG. 5 depicts an illustrative process for producing an estimate of a digital sequence in accordance with some implementations. At 510, a continuous-time signal x(t) corresponding to a digital sequence is obtained. The continuous-time signal may correspond to, e.g., a digital sequence of bits stored on a hard disk drive or other data storage system. The continuous-time signal x(t) has a symbol period of T seconds. In some implementations, the continuous-time signal x(t) corresponds to the continuous-time signal x(t) 315 of FIG. 3.

At 520, the continuous-time signal x(t) is sampled with an oversampling factor M, where M is an integer value greater than or equal to 1, to produce a corresponding discrete-time signal y(n,1:M). That is, the continuous-time signal x(t) is sampled once every T/M seconds. In some implementations, the sampling is performed by the A/D conversion module 320 of FIG. 3 and the discrete-time signal y(n,1:M) corresponds to the discrete-time signal y(n,1:M) 325. At 530, the discrete-time signal y(n,1:M) is processed to produce a phase offset estimate. In some arrangements, the phase offset estimate is produced using the phase estimation module 360 of FIG. 3.

At 540, the discrete-time signal y(n,1:M) is interpolated based on the phase offset estimate obtained at 530 to produce an interpolated discrete-time signal z(n). In particular, while the discrete-time signal y(n,1:M) is oversampled by a factor of M at 540, the interpolated discrete-time signal z(n) is at a system baud rate, i.e., has a symbol period of T seconds. In some arrangements, the interpolation is performed by the interpolation module 340 of FIG. 3 and the interpolated discrete-time signal z(n) corresponds to the interpolated discrete-time signal z(n) 345 of FIG. 3. At 550, the interpolated discrete-time signal z(n) is processed to produce an estimate of the digital sequence. In some arrangements, the estimate is produced using the digital detection module 350 of FIG. 3 and the estimate of the digital sequence corresponds to the decision output sequence 355 of FIG. 3.

The above described implementations are presented for the purposes of illustration and not of limitation. Other embodiments are possible and one or more parts of techniques described above may be performed in a different order (or concurrently) and still achieve desirable results. In addition, techniques of the disclosure may be implemented in hardware, such as on an application-specific integrated circuit (ASIC) or on a field-programmable gate array (FPGA). The techniques of the disclosure may also be implemented in software.

What is claimed is:

1. A method for decoding, the method comprising:
   obtaining a continuous-time signal, wherein the continuous-time signal corresponds to a preamble portion of a repeated runout;
   sampling the continuous-time signal with an oversampling factor to produce a discrete-time signal corresponding to the continuous-time signal;
   producing a phase offset estimate of the continuous-time signal based on parallel substreams derived from the discrete-time signal;
   delaying the discrete-time signal at least until the phase offset estimate is produced;
   interpolating the delayed discrete-time signal based on the phase offset estimate to produce an interpolated discrete-time signal; and
   processing the interpolated discrete-time signal to produce an estimate of a digital sequence.

2. The method of claim 1, wherein the continuous-time signal is obtained from data stored on a hard disk drive.

3. The method of claim 1, wherein the continuous-time signal has a symbol period of T seconds, and wherein sampling the continuous-time signal comprises sampling the continuous-time signal once every T/M seconds, where M is the oversampling factor.

4. The method of claim 1, wherein producing the phase offset estimate comprises applying a Discrete Fourier Transform (DFT) to the discrete-time signal.

5. The method of claim 4, wherein applying the DFT to the discrete-time signal comprises applying the DFT to a periodic subsequence of the discrete-time signal.

6. The method of claim 4, wherein the phase offset estimate comprises one or more interpolation coefficients.

7. The method of claim 1, wherein interpolating the discrete-time signal comprises applying cubic spline interpolation to the discrete-time signal.

8. The method of claim 1, wherein the discrete-time signal is delayed for a pre-specified length of time required to determine the phase offset estimate of the continuous-time signal based on the discrete-time signal.

9. A system for decoding, the system comprising:
   read circuitry configured to obtain a continuous-time signal, wherein the continuous-time signal corresponds to a preamble portion of a repeated runout;
   analog-to-digital (A/D) conversion circuitry configured to sample the continuous-time signal with an oversampling factor to produce a discrete-time signal corresponding to the continuous-time signal;
   estimation circuitry configured to determine a phase offset estimate of the continuous-time signal based on parallel substreams derived from the discrete-time signal;
   delay circuitry configured to delay the discrete-time signal at least until the estimation circuitry determines the phase offset estimate;
   interpolation circuitry configured to interpolate the delayed discrete-time signal based on the phase offset estimate to produce an interpolated discrete-time signal; and
   detection circuitry configured to process the interpolated discrete-time signal to produce an estimate of a digital sequence.

10. The system of claim 9, wherein the read circuitry is further configured to read the continuous-time signal from data stored on a hard disk drive.

11. The system of claim 9, wherein the continuous-time signal has a symbol period of T seconds, and wherein the A/D conversion circuitry is further configured to sample the continuous-time signal once every T/M seconds, where M is the oversampling factor.

12. The system of claim 9, wherein the estimation circuitry is further configured to produce the phase offset estimate by applying a Discrete Fourier Transform (DFT) to the discrete-time signal.

13. The system of claim 12, wherein applying the DFT to the discrete-time signal comprises applying the DFT to a periodic subsequence of the discrete-time signal.

14. The system of claim 12, wherein the estimation circuitry is further configured to determine the phase offset estimate in a form of one or more interpolation coefficients.

15. The system of claim 9, wherein the interpolation circuitry is further configured to interpolate the discrete-time signal based on the phase offset estimate using cubic spline interpolation.

16. The system of claim 9, wherein the delay circuitry is further configured to:
   receive the discrete-time signal from the A/D conversion circuitry; and
   provide the delayed discrete-time signal to the interpolation circuitry after delaying the discrete-time signal for a pre-specified length of time, wherein the pre-specified length of time is based on a length of time required for the estimation circuitry to determine the phase offset estimate of the continuous-time signal based on the discrete-time signal.

\* \* \* \* \*